Aug. 17, 1965     S. HASKIN     3,201,069
JET-PROPELLED AIRCRAFT ENGINE MOUNTING
Filed May 31, 1962

United States Patent Office 3,201,069
Patented Aug. 17, 1965

3,201,069
JET-PROPELLED AIRCRAFT ENGINE MOUNTING
Simon Haskin, 891 Rathdown St., North Carlton,
Victoria, Australia
Filed May 31, 1962, Ser. No. 199,163
4 Claims. (Cl. 244—54)

This invention relates to aircraft of the type propelled by jet engines, particularly the so-called turbo-jet engines.

It is known from elementary mechanics that whenever the axis of rotation or spin of a body changes its orientation, i.e. the body undergoes a so-called precessional motion, it is subjected to a form of angular acceleration which is known as gyroscopic acceleration. The couple which gives rise to this acceleration is known as a gyroscopic couple. In the case of a body which is rotating on a shaft and is subjected to precessional motion, the gyroscopic couple brought about by the precession is exerted by the shaft on its bearings, which, of course, exert an equal and opposite reaction couple on the shaft.

In aircraft of the kind to which the invention relates the spining rotors of the turbine engines experience precession mainly when the aircraft is beginning to climb to gain altitude, such as on takeoff, or when it is descending, e.g. when coming in to land. The gyroscopic couples generated on these occasions are transmitted to the engine mountings of the aircraft, and the reaction forces necessary to counteract the effect of these couples cause extensive vibration and sometimes shuddering of the whole aircraft. Prolonged and/or repeated application of such vibrations to the air frame may seriously weaken it and bring about fatigue of structural parts.

The principal object of the invention is to provide means whereby the generation of gyroscopic couples by turbo-jet engines is prevented, whether the engines are mounted outside or inside the wings of the aircraft.

The object of the invention is to pivotally mount the engine to the aircraft so that the wing structure is relieved of the severe stresses imparted thereto by the gyroscopic effect of the engines during unexpected ascents or descents in turbulent conditions and the same is accomplished by mounting the engines so that the same are free to move angularly relative to the aircraft about a horizontal axis transverse to the longitudinal axis of the aircraft thus allowing the engines to maintain their horizontal position as the aircraft ascends or descends thereby relieving the aircraft of the stresses which normally would be developed if the engines were forced to remain in a constant attitude to the aircraft.

By virtue of other factors, the engine cannot be permitted to move freely angularly with respect to the aircraft under the conditions met while the aircraft is on the ground during take-off and landing and consequently, a control device such as a hydraulic cylinder or dashpot is utilized for enabling the engine to be locked relative to the aircraft during take-off and landing and such hydraulic device is controlled by the movement of the elevators whereby the engine is locked in position relative to the aircraft when the elevators are in their neutral position and unlocked in response to movement of the elevators from the neutral position.

For a full understanding of the invention, attention is directed to the accompanying drawings, wherein.

Figure 1:
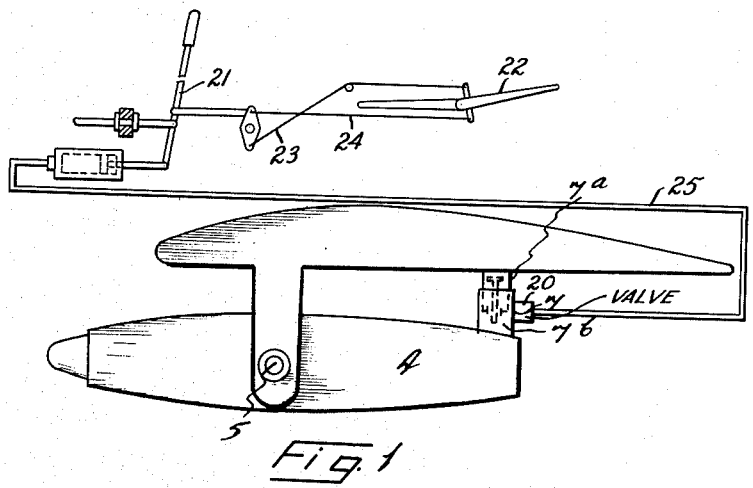
FIGURE 1 is a side elevation showing a turbo-jet engine mounted below the wing of an aircraft, in a manner according to the invention.

In the preferred embodiment of the invention illustrated in the drawings, each turbo-jet engine is, in effect, pivotally mounted at about its center of gravity so that as the aircraft begins to ascend, the gyroscopic effect is dissipated via the mountings of the engine as will later be described.

In the construction illustrated, the two forward mountings of the engine 4, comprise swivel or gymbal mountings 5 and 6, which permit pivotal movement of the engine while the rear mounting is a dash pot 7, one element 7a of which is swivelly connected to the aircraft, whilst the other element 7b is similarly connected to the engine. The dash pot may be either of hydraulic or pneumatic type and is provided with a valve 20 for controlling fluid flow to and from the dash-pot 7 with the valve being operated by the elevators of the aircraft. More particularly, a control stick 21 is suitably connected to elevators 22 by control lines 23 and 24 and the stick is operably coupled to the valve 20 via air conduit ments 25. When the elevators 22 are in the neutral position, that/is, in alignment with the general contour of the wing, the engine is locked in position relative to the aircraft, but in response to movement of the elevators from the neutral position, the engine is unlocked.

Figure 2:
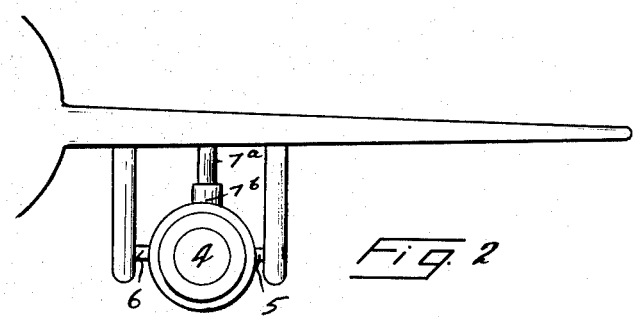
FIGURE 2 is a front elevation of the arrangement of FIGURE 1.

In FIGURES 1 and 2 the invention is illustrated as applied to an engine 4 carried under the wing of an aircraft.

Figure 3:
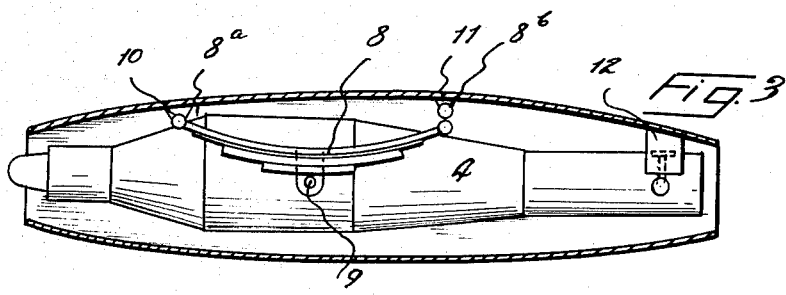
FIGURE 3 is a side sectional elevation showing the invention applied to a turbo-jet engine mounted in the an aircraft.

In FIGURE 3 the arrangement is illustrated where the engine 4 is accommodated in the wing, and therein it will be seen that the forward part of the engine is supported on a spring assembly 8 at either side, the spring assembly being pivotally connected to the engine as shown at 9, while the ends 8a and 8b of the spring assembly are mounted on swivels or gymbals 10 and 11.

The rearward part of the engine is supported by a dash pot arrangement 12, in which there may be one centrally arranged dash pot, or one dash pot at either side of the rear portion of the engine, as illustrated. Each dashpot includes a valve controlled by the elevators as previously described in connection with FIGS. 1 and 2.

In aircraft having turbo-jet engines mounted as herein described and illustrated, the engines adjust themselves as the aircraft climbs or lifts, so that the jets issue in a substantially horizontal direction, or that is to say the engines at all times are supported in a horizontal plane and do not tilt in accordance with upwardly angular disposition of the aircraft as it climbs.

However, when the aircraft is on the ground and the elevators in the neutral position, the engine is locked in position relative to the aircraft. This is necessary because the engines are not stable when the aircraft is on the ground as the engines are generally not rotating at a sufficient speed to generate a sufficiently pronounced gyroscopic stabilizing effect and because the engines can be jolted from their horizontal disposition during travel over uneven runways and the like. On the other hand, when the elevators are moved from the neutral position, the engines are unlocked in response to such movement thereby allowing the engines to adjust themselves as previously described.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. In a turbo-jet propelled aircraft, a mounting arrangement for each engine of the aircraft which comprises a pair of spaced support members extending downwardly from a wing, pivotal connections between the lower ends of the support members and the engine at the region of the center of gravity of the engine, said engine being suspended between the support members for free angular movement relative to the aircraft about a horizontal axis transverse to the longitudinal axis of the aircraft, a dash pot connected between one end of the engine and the wing, said dash pot comprising two operating elements connected, respectively, to the wing and the engine, a valve for the dash pot, and elevators for said aircraft coupled with said dash pot and operative upon being in a neutral position to actuate said dash pot to lock the engine in a horizontal position relative to the wing and unlock the engine when the elevators are moved from such neutral position.

2. A structure as defined in claim 1, wherein the support members also incorporate leaf springs, whereby the transmission of any vibration of the wings to the engine is minimized.

3. A structure as defined in claim 2, wherein the engine is mounted inside the wing of the aircraft.

4. In a turbo-jet propelled aircraft having a wing, elevator surfaces therefor, and at least one engine, means for mounting the engine on the wing for free angular movement relative to the aircraft about a horizontal axis transverse to the longitudinal axis of the aircraft, a fluid operated locking means operably connected to the wing and to the engine, valve means for said fluid operated means, and further means coupled between said elevator surfaces and valve means operative when said elevator surfaces are in the neutral position to actuate the fluid operated means to lock the engine in a horizontal position relative to the wing and unlock the engine when the elevator surfaces are moved from such neutral position.

References Cited by the Examiner

UNITED STATES PATENTS

| | | | |
|---|---|---|---|
| 2,661,593 | 12/53 | Hughes et al. | 60—39.31 |
| 2,940,692 | 6/60 | Kerry et al. | 60—35.6 |
| 3,045,953 | 7/62 | Eggers et al. | 244—52 |

FOREIGN PATENTS 217,119   2/42   Switzerland.

FERGUS S. MIDDLETON, *Primary Examiner.*

MILTON BUCHLER, ANDREW H. FARRELL,
*Examiners.*